(12) United States Patent
Seo et al.

(10) Patent No.: US 7,558,467 B2
(45) Date of Patent: Jul. 7, 2009

(54) RECORDING MEDIUM AND METHOD AND APPARATUS FOR REPRODUCING AND RECORDING TEXT SUBTITLE STREAMS

(75) Inventors: Kang Soo Seo, Anyang-si (KR); Byung Jin Kim, Seongnam-si (KR); Jea Yong Yoo, Seoul (KR)

(73) Assignee: LG Electronics, Inc., Seoul (KR)

( * ) Notice: Subject to any disclaimer, the term of this patent is extended or adjusted under 35 U.S.C. 154(b) by 683 days.

(21) Appl. No.: 11/062,792

(22) Filed: Feb. 23, 2005

(65) Prior Publication Data

US 2005/0191032 A1 Sep. 1, 2005

(30) Foreign Application Priority Data

Feb. 26, 2004 (KR) ............ 10-2004-0013098
Mar. 17, 2004 (KR) ............ 10-2004-0018091

(51) Int. Cl.
*H04N 5/91* (2006.01)
*H04N 5/00* (2006.01)

(52) U.S. Cl. .................. 386/69; 386/95; 386/125
(58) Field of Classification Search ........... 386/95, 386/69, 125, E9.013; 348/E5.1, E9.037, 348/E11.021
See application file for complete search history.

(56) References Cited

U.S. PATENT DOCUMENTS

| | | | |
|---|---|---|---|
| 3,128,434 A | 4/1964 | Moreines | |
| 5,253,530 A | 10/1993 | Letcher, III | |
| 5,467,142 A | 11/1995 | Ichinokawa | |
| 5,519,443 A | 5/1996 | Salomon et al. | |
| 5,537,151 A | 7/1996 | Orr et al. | |
| 5,758,007 A | 5/1998 | Kitamura et al. | |
| 5,781,687 A | 7/1998 | Parks | |
| 5,832,530 A | 11/1998 | Paknad et al. | |
| 6,009,234 A | 12/1999 | Taira et al. | |

(Continued)

FOREIGN PATENT DOCUMENTS

CN 1348588 5/2002

(Continued)

OTHER PUBLICATIONS

Office Action dated Dec. 13, 2007 for corresponding European Patent Application No. 04 800 131.7-2223.

(Continued)

*Primary Examiner*—Thai Tran
*Assistant Examiner*—Syed Y Hasan
(74) *Attorney, Agent, or Firm*—Harness, Dickey & Pierce, PLC

(57) ABSTRACT

A recording medium and method and apparatus for reproducing and recording text subtitle streams are disclosed. A PlayList file contains a set of PlayItems and a SubPlayItem. Each PlayItem is configured to reproduce at least one main AV stream, and the SubPlayItem is configured to reproduce at least one text subtitle stream. The PlayList file further contains synchronization information which indicates a presentation start time of the SubPlayItem within a playing time interval of one of the set of PlayItems. The PlayList file, main AV stream, and text subtitle streams are recorded on a recording medium. Each text subtitle stream includes a plurality of dialog presentation segments, each of which includes at least one region of dialog text.

34 Claims, 13 Drawing Sheets

U.S. PATENT DOCUMENTS

| | | | |
|---|---|---|---|
| 6,128,434 | A | 10/2000 | Hirayama et al. |
| 6,148,140 | A | 11/2000 | Okada et al. |
| 6,173,113 | B1 | 1/2001 | Okada et al. |
| 6,204,883 | B1 | 3/2001 | Tsukagoshi |
| 6,219,043 | B1 | 4/2001 | Yogeshwar et al. |
| 6,222,532 | B1 | 4/2001 | Ceccarelli et al. |
| 6,230,295 | B1 | 5/2001 | Watkins |
| 6,253,221 | B1 | 6/2001 | Kim et al. |
| 6,262,775 | B1 | 7/2001 | Kim |
| 6,320,621 | B1 | 11/2001 | Fu |
| 6,393,196 | B1 | 5/2002 | Yamane et al. |
| 6,661,467 | B1 | 12/2003 | Van Der Meer et al. |
| 6,747,920 | B2 | 6/2004 | Denda et al. |
| 6,792,577 | B1 | 9/2004 | Kimoto |
| 7,151,617 | B2 | 12/2006 | Fukushima et al. |
| 7,174,560 | B1 | 2/2007 | Crinon |
| 7,188,353 | B1 | 3/2007 | Crinon |
| 2002/0004755 | A1 | 1/2002 | Balthaser |
| 2002/0010924 | A1 | 1/2002 | Kalhour |
| 2002/0106193 | A1 | 8/2002 | Park et al. |
| 2002/0135608 | A1 | 9/2002 | Hamada et al. |
| 2002/0151992 | A1 | 10/2002 | Hoffberg et al. |
| 2002/0159757 | A1 | 10/2002 | Ando et al. |
| 2002/0194618 | A1 | 12/2002 | Okada et al. |
| 2003/0039472 | A1 | 2/2003 | Kim |
| 2003/0078858 | A1 | 4/2003 | Angelopoulos et al. |
| 2003/0085997 | A1 | 5/2003 | Takagi et al. |
| 2003/0099464 | A1 | 5/2003 | Oh et al. |
| 2003/0103604 | A1 | 6/2003 | Kato et al. |
| 2003/0147629 | A1 | 8/2003 | Kikuchi et al. |
| 2003/0188312 | A1 | 10/2003 | Bae et al. |
| 2003/0189571 | A1 | 10/2003 | MacInnis et al. |
| 2003/0189669 | A1 | 10/2003 | Bowser |
| 2003/0190147 | A1 | 10/2003 | Lee |
| 2003/0194211 | A1 | 10/2003 | Abecassis |
| 2003/0202431 | A1 | 10/2003 | Kim et al. |
| 2003/0206553 | A1 | 11/2003 | Surcouf et al. |
| 2003/0216922 | A1 | 11/2003 | Gonzales et al. |
| 2003/0235402 | A1 | 12/2003 | Seo et al. |
| 2003/0235406 | A1 | 12/2003 | Seo et al. |
| 2004/0001699 | A1 | 1/2004 | Seo et al. |
| 2004/0003347 | A1 | 1/2004 | Saidenberg et al. |
| 2004/0027369 | A1 | 2/2004 | Kellock et al. |
| 2004/0047605 | A1 | 3/2004 | Seo et al. |
| 2004/0054771 | A1 | 3/2004 | Roe et al. |
| 2004/0081434 | A1 | 4/2004 | Jung et al. |
| 2004/0151472 | A1 | 8/2004 | Seo et al. |
| 2004/0202454 | A1 | 10/2004 | Kim et al. |
| 2005/0013207 | A1 | 1/2005 | Tsumagari et al. |
| 2005/0105888 | A1* | 5/2005 | Hamada et al. ............... 386/95 |
| 2005/0147387 | A1 | 7/2005 | Seo et al. |
| 2006/0013563 | A1 | 1/2006 | Adolph et al. |
| 2006/0098936 | A1 | 5/2006 | Ikeda et al. |
| 2006/0156358 | A1 | 7/2006 | Adolph et al. |
| 2006/0259941 | A1 | 11/2006 | Goldberg et al. |

FOREIGN PATENT DOCUMENTS

| | | |
|---|---|---|
| CN | 1368732 | 9/2002 |
| CN | 1864220 | 11/2006 |
| EP | 0737016 | 10/1996 |
| EP | 0863509 | 9/1998 |
| EP | 0971536 | 1/2000 |
| EP | 0755161 | 10/2001 |
| EP | 1178691 | 2/2002 |
| EP | 1326451 | 7/2003 |
| GB | 1586431 | 3/1981 |
| JP | 09-102940 | 4/1997 |
| JP | 11252518 | 9/1999 |
| JP | 2000-324395 | 11/2000 |
| JP | 2000-3243953 | 11/2000 |
| JP | 2002-290895 | 10/2002 |
| JP | 2003-061098 | 2/2003 |
| JP | 2003-224826 | 8/2003 |
| JP | 2003-230136 | 8/2003 |
| KR | 10-2001-0001725 | 1/2001 |
| KR | 10-2002-0043812 | 6/2002 |
| KR | 10-2003-0030554 | 4/2003 |
| TW | 578068 | 3/2004 |
| TW | 200407812 | 5/2004 |
| WO | WO 03/105152 | 12/2003 |
| WO | WO 2005-034122 | 4/2005 |
| WO | WO 2005/045833 | 5/2005 |
| WO | WO 2005/079171 | 9/2005 |
| WO | WO 2005/083708 | 9/2005 |

OTHER PUBLICATIONS

International Search Report Dated Aug. 5, 2005.
Understanding SAMI 1.0, *Microsoft Corp.* XP007902747 (pub. Oct. 2001, updated Feb. 2003).
Office Action for corresponding Taiwanese application dated Apr. 30, 2008.
Jakob Nielson's Alertbox for Jul. 1, 1997, "Effective Use of Style Sheets," www.useit.com/alertbox/9709a.html.
Malaysian Office Action dated Nov. 14, 2008.
English translation of Chinese Office Action dated Sep. 26, 2008.
Russian Office Action dated Dec. 22, 2008 with English translation.
English translation of Russian Office Action dated Jan. 23, 2009.

* cited by examiner

FIG. 8

```
Subpath(){
    length
    SubPath_type
    is_repeat_SubPath
    number_of_SubPlayItems
    for(i=0;i<number_of_SubPlayItems;i++){
        SubPlayItem(i)
    }
    ~
}

0 : reserved
    1 : reserved
    2 : Audio presentation path of
        the Browsable slideshow
    3 : Interactive graphic presentation menu
        presentation path
    4 : Text subtitle presentation path
    5~255 : reserved SubPlayItem(i){
    length
    Clip_information_file_name[0]
    Clip_codec_identifier[0]
    reserved_for_future_use
    is_multi_Clip_entries
    ref_to_STC_id[0]
    SubPlayItem_IN_time
    SubPlayItem_OUT_time
    sync_PlayItem_id
    sync_start_PTS_of_PlayItem
    if(is_multi_Clip_entries==1,)ᵇ{
        reserved_for_future_use
        num_of_Clip_entries
        for(subclip_entry_id=1;
            subclip_entry_id<num_of_Clip_entries;
            subclip_entry_id++){
                Clip_information_file_name[subclip_entry_id]
                Clip_Codec_Identifier[subclip_entry_id]
                ref_to_STC_id[subclip_entry_id]
                reserved_for_future_use
        }
        ~
    }
    ~
}
```

FIG. 11

```
zzzzz.Clpi {
  . . . . . . . .
  ClipInfo ( )
  SequenceInfo (●)
  ProgramInfo ( )
  CPI ( )
  ClipMark ( )
  . . . . . . . .
}
```

```
SequenceInfo(){
  length
  reserved_for_word_align
  number_of_ATC_sequences
  for(atc_id=0;atc_id<number_of_ATC_sequences;atc_id++){
    SPN_ATC_start[atc_id]
    number_of_STC_sequences[atc_id]
    offset_STC_id[atc_id]
    for(stc_id = offset_STC_id[atc_id];
        stc_id<(number_of_STC_sequences[atc_id]+offset_STC_id[atc_id]);
        stc_id++){
      PCR_PID[atc_id][stc_id]
      SPN_STC_start[atc_id][stc_id]
      presentation_start_time[atc_id][stc_id]
      presentation_end_time[atc_id][stc_id]
```

RECORDING MEDIUM AND METHOD AND APPARATUS FOR REPRODUCING AND RECORDING TEXT SUBTITLE STREAMS

This application claims the benefit of the Korean Patent Application No. 10-2004-0013098, filed on Feb. 26, 2004, and No. 10-2004-0018091, filed on Mar. 17, 2004, which are hereby incorporated by reference as if fully set forth herein.

BACKGROUND OF THE INVENTION

1. Field of the Invention

The present invention relates to a recording medium, and more particularly, to a recording medium and method and apparatus for reproducing and recording text subtitle streams. Although the present invention is suitable for a wide scope of applications, it is particularly suitable for recording the text subtitle stream file within the recording medium and effectively reproducing the recorded text subtitle stream.

2. Discussion of the Related Art

Optical discs are widely used as an optical recording medium for recording mass data. Presently, among a wide range of optical discs, a new high-density optical recording medium (hereinafter referred to as "HD-DVD"), such as a Blu-ray Disc (hereafter referred to as "BD"), is under development for writing and storing high definition video and audio data. Currently, global standard technical specifications of the Blu-ray Disc (BD), which is known to be the next generation technology, are under establishment as a next generation optical recording solution that is able to have a data significantly surpassing the conventional DVD, along with many other digital apparatuses.

Accordingly, optical reproducing apparatuses having the Blu-ray Disc (BD) standards applied thereto are also being developed. However, since the Blu-ray Disc (BD) standards are yet to be completed, there have been many difficulties in developing a complete optical reproducing apparatus. Particularly, in order to effectively reproduce the data from the Blu-ray Disc (BD), not only should the main AV data as well as various data required for a user's convenience, such as subtitle information as the supplementary data related to the main AV data, be provided, but also managing information for reproducing the main data and the subtitle data recorded in the optical disc should be systemized and provided.

However, in the present Blu-ray Disc (BD) standards, since the standards of the supplementary data, particularly the subtitle stream file, are not completely consolidated, there are many restrictions in the full-scale development of a Blu-ray Disc (BD) basis optical reproducing apparatus. And, such restrictions cause problems in providing the supplementary data such as subtitles to the user.

SUMMARY OF THE INVENTION

Accordingly, the present invention is directed to a recording medium and method and apparatus for reproducing and recording text subtitle streams that substantially obviate one or more problems due to limitations and disadvantages of the related art.

An object of the present invention is to provide a method and apparatus for recording text subtitle streams in a recording medium, such as a blu-ray disc, and to provide a method and apparatus for reproducing the recorded text subtitle streams.

Another object of the present invention is to provide a method of creating style information when recording text subtitle streams within a recording medium.

A further object of the present invention is to provide a method and apparatus for reproducing text subtitle streams that can effectively reproduce the text subtitle streams.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium for reproducing text subtitle streams includes a first data area storing at least one PlayList file, each PlayList file containing a set of PlayItems and a SubPlayItem, each PlayItem being configured to reproduce at least one main AV stream, the SubPlayItem being configured to reproduce at least one text subtitle stream, the PlayList file further containing synchronization information which indicates a presentation start time of the SubPlayItem within a playing time interval of one of the set of PlayItems, and a second data area storing the at least one main AV stream and the at least one text subtitle stream.

In another aspect of the present invention, a recording medium for reproducing text subtitle streams includes a first data area storing a text subtitle stream including a plurality of dialog presentation segments, each dialog presentation segment containing at least one region of dialog text and specifying presentation start and end times of the at least one region of dialog text, wherein an initial value of a system time clock for the text subtitle stream is a presentation start time of the first dialog presentation segment included in the text subtitle stream.

In another aspect of the present invention, a method of reproducing text subtitle streams includes reading a PlayList file recorded on a recording medium, reading a set of PlayItems and a SubPlayItem included in the PlayList file, each PlayItem being configured to reproduce at least one main AV stream recorded on the recording medium, the SubPlayItem being configured to reproduce at least one text subtitle stream recorded on the recording medium, reading synchronization information included in the SubPlayItem, the synchronization information including a first data field indicating a PlayItem identification value of one of the set of PlayItems and a second data field indicating a presentation start time of the SubPlayItem within a playing time interval of the PlayItem identified by the PlayItem identification value, and synchronizing presentation of the SubPlayItem with presentation of the PlayItem identified by the PlayItem identification value.

In another aspect of the present invention, a method of reproducing text subtitle streams includes reading a text subtitle stream recorded on a recording medium, reading a plurality of dialog presentation segments included in the text subtitle stream, each dialog presentation segment containing at least one region of dialog text and specifying presentation start and end times of the at least one region of dialog text, setting an initial value of a system time clock for the text subtitle stream to a presentation start time of the first dialog presentation segment included in the text subtitle stream, and presenting the at least one region of dialog text using the presentation start and end times which are based on the system time clock.

In another aspect of the present invention, an apparatus for reproducing text subtitle streams includes a driver configured to drive an optical reproducing device to reproduce data recorded on a recording medium, and a controller configured to control the driver to read at least one PlayList file recorded on the recording medium, each PlayList file containing a set of PlayItems and a SubPlayItem, each PlayItem being configured to reproduce at least one main AV stream, the SubPlayItem being configured to reproduce at least one text subtitle stream, the SubPlayItem including synchronization information which indicates a presentation start time of the SubPlayItem within a playing time interval of one of the set of PlayItems.

In a further aspect of the present invention, an apparatus for reproducing text subtitle streams includes a driver configured to drive an optical reproducing device to reproduce data recorded on a recording medium, and a controller configured to control the driver to read a text subtitle stream recorded on the recording medium, the text subtitle stream including a plurality of dialog presentation segments, each dialog presentation segment containing at least one region of dialog text and specifying presentation start and end times of the at least one region of dialog text, wherein an initial value of a system time clock for the text subtitle stream is a presentation start time of the first dialog presentation segment included in the text subtitle stream.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 8 illustrates a set of SubPath information among reproduction control file information for controlling reproduction of the text subtitle stream according to the present invention;

FIG. 11 illustrates a ClipInfo file among reproduction control file information for controlling reproduction of the text subtitle stream according to the present invention.

DETAILED DESCRIPTION OF THE INVENTION

Figure 1:
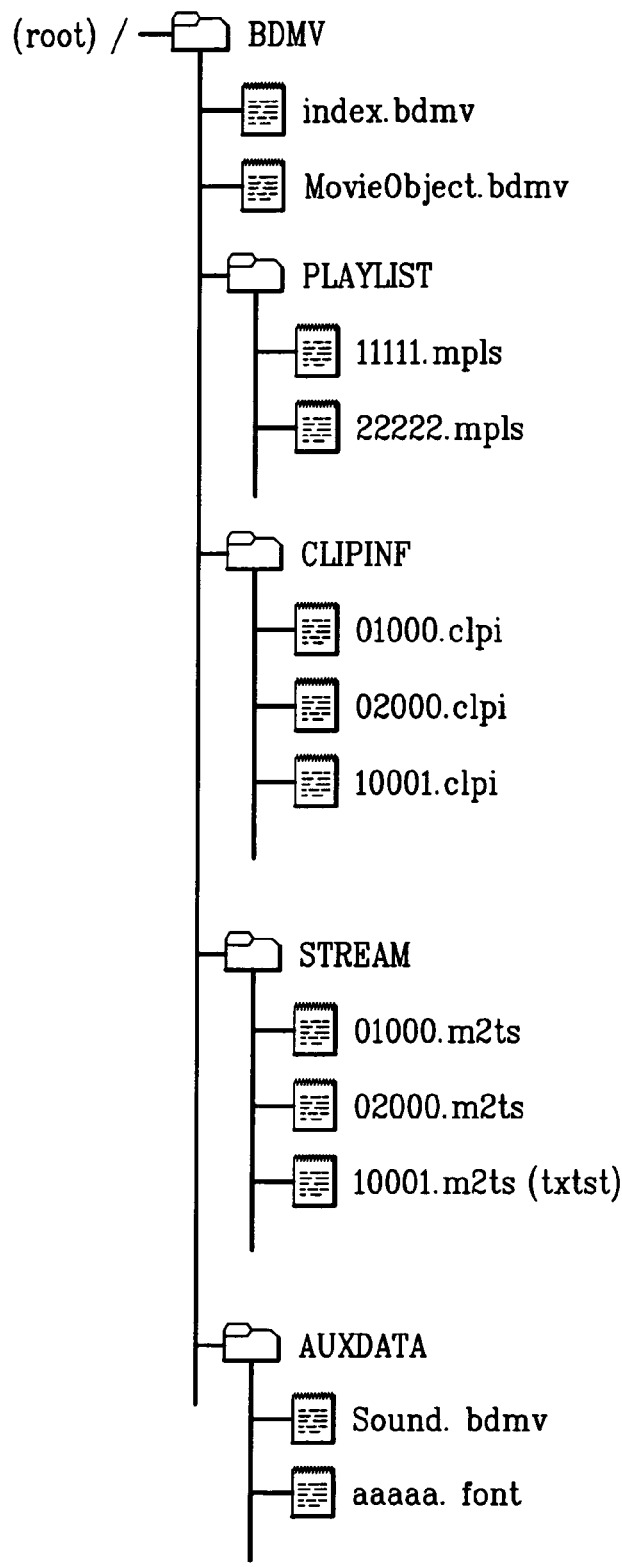
FIG. 1 illustrates a structure of data files recorded in a high density optical disc according to the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium.

In this detailed description, "main data" represent audio/video (AV) data that belong to a title (e.g., a movie title) recorded in an optical disc by an author. In general, the AV data are recorded in MPEG2 format and are often called AV streams or main AV streams. In addition, "supplementary data" represent all other data required for reproducing the main data, examples of which are text subtitle streams, interactive graphic streams, presentation graphic streams, and supplementary audio streams (e.g., for a browsable slide-show). These supplementary data streams may be recorded in MPEG2 format or in any other data format. They could be multiplexed with the AV streams or could exist as independent data files within the optical disc.

A "subtitle" represents caption information corresponding to video (image) data being reproduced, and it may be represented in a predetermined language. For example, when a user selects an option for viewing one of a plurality of subtitles represented in various languages while viewing images on a display screen, the caption information corresponding to the selected subtitle is displayed on a predetermined portion of the display screen. If the displayed caption information is text data (e.g., characters), the selected subtitle is often called a "text subtitle". According to one aspect of the present invention, a plurality of text subtitle streams in MPEG2 format may be recorded in an optical disc, and they may exist as a plurality of independent stream files. Each "text subtitle stream file" is created and recorded within an optical disc. And, the purpose of the present invention is to provide a method and apparatus for reproducing the recorded text subtitle stream file. Most particularly, by synchronizing the text subtitle stream with the main data (AV stream), the present invention proposes a method of providing to the users a text subtitle stream synchronized with the main data (AV stream).

FIG. 1 illustrates a file structure of the data files recorded in a Blu-ray disc (hereinafter referred to as "BD") according to the present invention. Referring to FIG. 1, at least one BD directory (BDMV) is included in a root directory (root). Each BD directory includes an index file (index.bdmv) and an object file (MovieObject.bdmv), which are used for interacting with one or more users. For example, the index file may contain data representing an index table having a plurality of selectable menus and movie titles. Each BD directory further includes four file directories that include audio/video (AV) data to be reproduced and various data required for reproduction of the AV data.

The file directories included in each BD directory are a stream directory (STREAM), a clip information directory (CLIPINF), a playlist directory (PLAYLIST), and an auxiliary data directory (AUX DATA). First of all, the stream directory (STREAM) includes audio/video (AV) stream files having a particular data format. For example, the AV stream files may be in the form of MPEG2 transport packets and be named as "*.m2ts", as shown in FIG. 1. The stream directory may further include one or more text subtitle stream files, where each text subtitle stream file includes text (e.g., characters) data for a text subtitle represented in a particular language and reproduction control information of the text data. The text subtitle stream files exist as independent stream files within the stream directory and may be named as "*.m2ts" or "*.txtst", as shown in FIG. 1. An AV stream file or text subtitle stream file included in the stream directory is often called a clip stream file.

Next, the clip information directory (CLIPINF) includes clip information files that correspond to the stream files (AV or text subtitle) included in the stream directory, respectively. Each clip information file contains property and reproduction timing information of a corresponding stream file. For example, a clip information file may include mapping information, in which presentation time stamps (PTS) and source packet numbers (SPN) are in a one-to-one correspondence and are mapped by an entry point map (EPM), depending upon the clip type. Accordingly, the ClipInfo file (*.clpi) related to the text subtitle stream according to the present invention will be described in detail in a later process with reference to FIG. 11.

Using the mapping information, a particular location of a stream file may be determined from a set of timing information (In-Time and Out-Time) provided by a PlayItem or SubPlayItem, which will be discussed later in more details. In the industry standard, each pair of a stream file and its corresponding clip information file is designated as a clip. For example, 01000.clpi included in CLIPINF includes property and reproduction timing information of 01000.m2ts included in STREAM, and 01000.clpi and 01000.m2ts form a clip.

Referring back to FIG. 1, the playlist directory (PLAYLIST) includes one or more PlayList files (*.mpls), where each PlayList file includes at least one PlayItem that designates at least one main AV clip and the reproduction time of the main AV clip. More specifically, a PlayItem contains information designating In-Time and Out-Time, which represent reproduction begin and end times for a main AV clip designated by Clip_Information_File_Name within the PlayItem. Therefore, a PlayList file represents the basic reproduction control information for one or more main AV clips. In addition, the PlayList file may further include a SubPlayItem, which represents the basic reproduction control information for a text subtitle stream file. When a SubPlayItem is included in a PlayList file to reproduce one or more text subtitle stream files, the SubPlayItem is synchronized with the PlayItem(s). On the other hand, when the SubPlayItem is used to reproduce a browsable slideshow, it may not be synchronized with the PlayItem(s). According to the present invention, the main function of a SubPlayItem is to control reproduction of one or more text subtitle stream files.

Accordingly, a main path refers to a path reproducing the main data by using at least one PlayItem included in a PlayList file, and a sub pat refers to a path reproducing the text subtitle stream as the supplementary data. More specifically, a main path must be included in a PlayList file, and at least one sub path for each attribute of a corresponding set of supplementary data is included, when the supplementary data exist. Thus, a reproduction using the main path and the sub path will be described in detail in a later process with reference to FIG. 4, and more specifically, a sub path syntax for reproducing the text subtitle stream according to the present invention will be described in detail with reference to FIG. 8.

Lastly, the auxiliary data directory (AUX DATA) may include supplementary data stream files, examples of which are font files (e.g., aaaaa.font or aaaaa.otf), pop-up menu files (not shown), and sound files (e.g., Sound.bdmv) for generating click sound. The text subtitle stream files mentioned earlier may be included in the auxiliary data directory instead of the stream directory.

Figure 2:
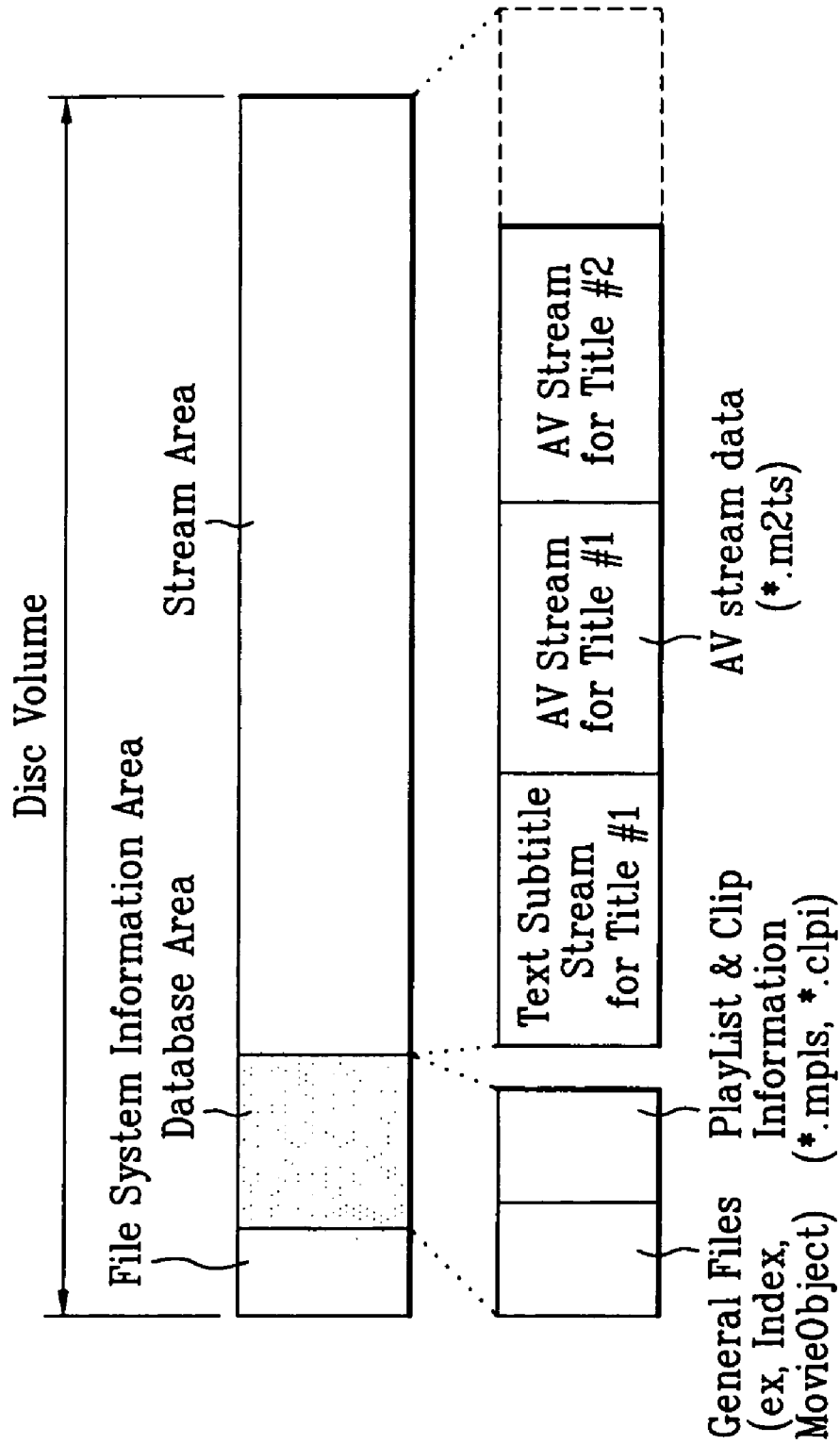
FIG. 2 illustrates data storage areas of the high density optical disc according to the present invention.

FIG. 2 illustrates data storage areas of an optical disc according to the present invention. Referring to FIG. 2, the optical disc includes a file system information area occupying the inmost portion of the disc volume, a stream area occupying the outmost portion of the disc volume, and a database area occupied between the file system information area and the stream area. In the file system information area, system information for managing the entire data files shown in FIG. 1 is stored. Next, main data and supplementary data (i.e., AV streams and one or more text subtitle streams) are stored in the stream area. The main data may include audio data, video data, and graphic data. And, the supplementary data (i.e., the text subtitle) is independently stored in the stream area without being multiplexed with the main data. The general files, PlayList files, and clip information files shown in FIG. 1 are stored in the database area of the disc volume. As discussed above, the general files include an index file and an object file, and the PlayList files and clip information files include information required to reproduce the AV streams and the text subtitle streams stored in the stream area. Using the information stored in the database area and/or stream area, a user is able to select a specific playback mode and to reproduce the main AV and text subtitle streams in the selected playback mode.

Figure 3:
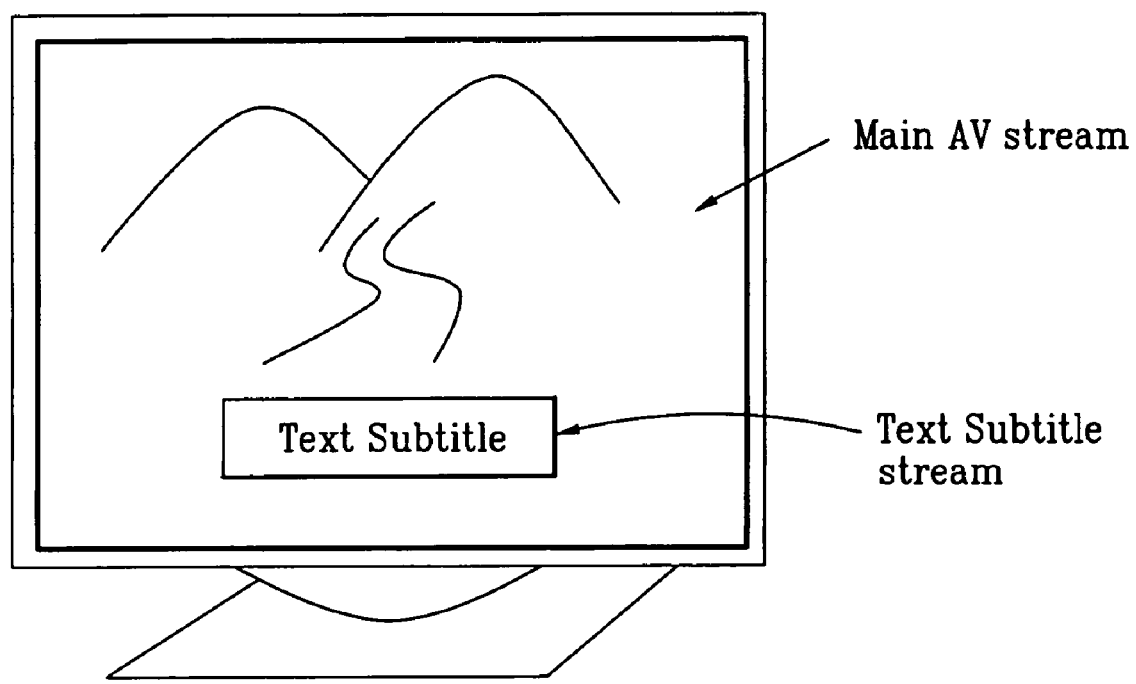
FIG. 3 illustrates a text subtitle and a main image presented on a display screen according to the present invention.

Hereinafter, the structure of the text subtitle stream file according to the present invention will be described in detail. First of all, the control information for reproducing the text subtitle stream will be newly defined. Then, the detailed description of the method of creating the text stream file including the newly defined control information, and the method and apparatus of reproducing the text subtitle stream for reproducing the recorded stream file will follow. FIG. 3 illustrates a text subtitle and a main image presented on a display screen according to the present invention. The main image and the text subtitle are simultaneously displayed on the display screen when a main AV stream and a corresponding text subtitle stream are reproduced in synchronization. Accordingly, the text subtitle stream must be provided by being synchronized in the main data, and the method of synchronizing the text subtitle stream with the main data will be proposed in the present invention.

Figure 4:
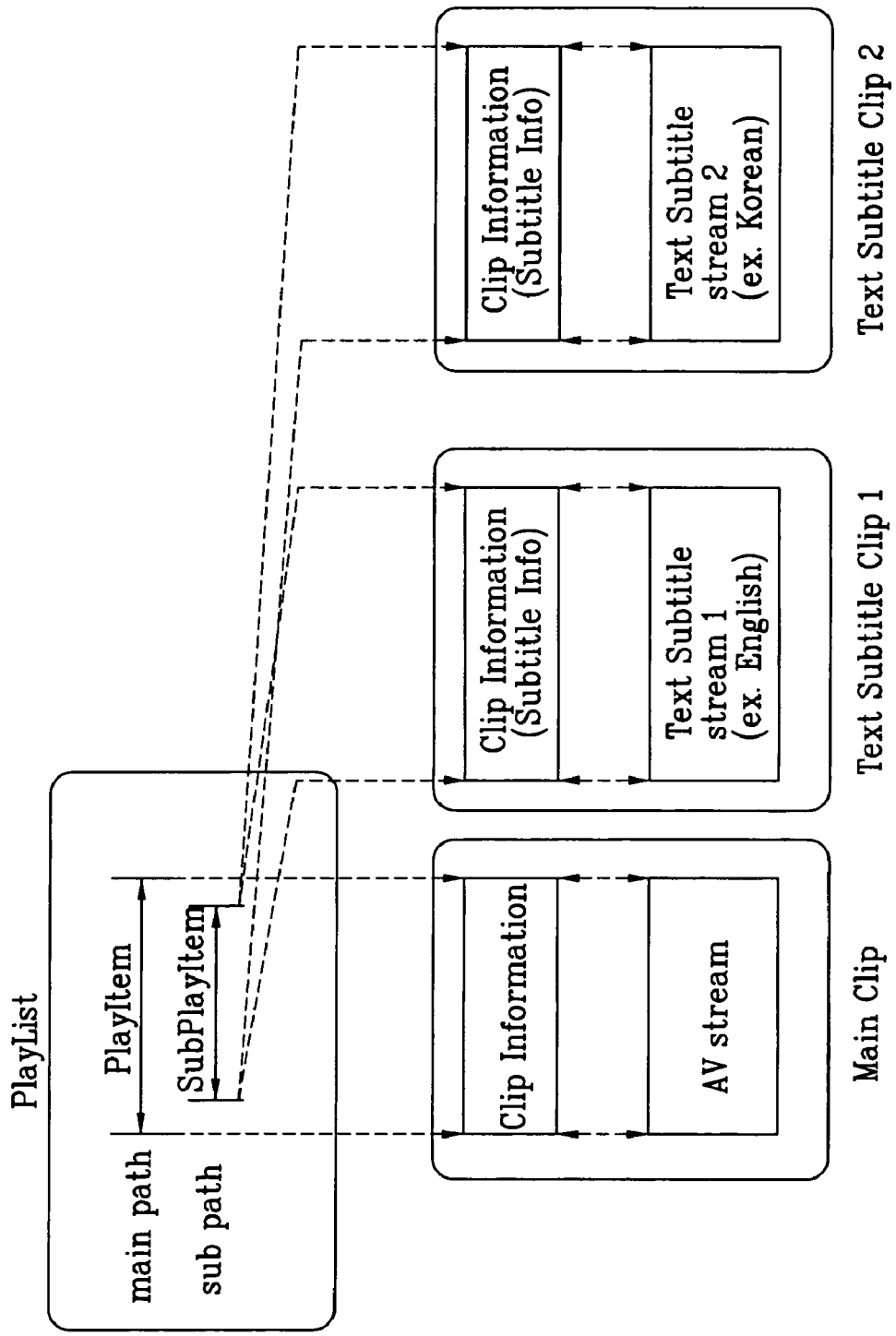
FIG. 4 illustrates a schematic diagram illustrating reproduction control of a text subtitle stream according to the present invention.

FIG. 4 is a schematic diagram illustrating reproduction control of a main AV clip and text subtitle clips according to the present invention. Referring to FIG. 4, a PlayList file includes at least one PlayItem controlling reproduction of at least one main AV clip and a SubPlayItem controlling reproduction of a plurality of text subtitle clips. More specifically, at least one PlayItem is included in the PlayList file as a main path for controlling reproduction of the main data (i.e., main clip). And, when a corresponding text subtitle stream exists within the main data, the text subtitle stream is controlled by a SubPlayItem as the sub path. For example, referring to FIG. 4, a text subtitle clip 1 (English) and a text subtitle clip 2 (Korean) are each reproduced and controlled by a single SubPlayItem. And, each of the text subtitle clip 1 and the text subtitle clip 2 is synchronized with the main data, thereby enabling the text subtitle and the main data to be displayed on a display screen simultaneously at a desired presentation time.

Figure 5A:
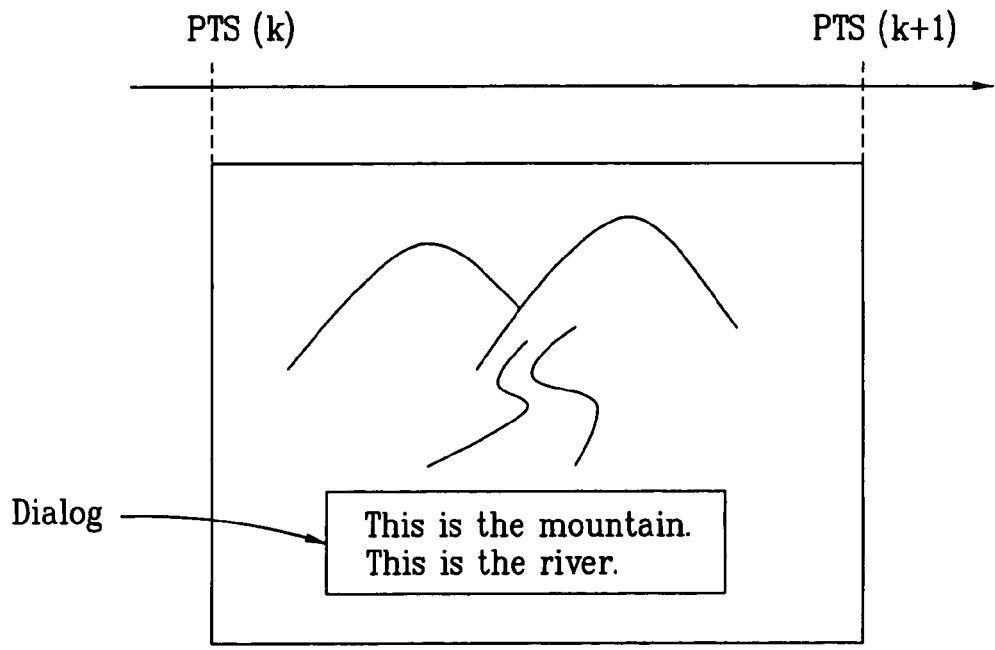
FIGS. 5A to 5C illustrate applications of the reproduction control information for reproducing the text subtitle stream according to the present invention.
Figure 5B:
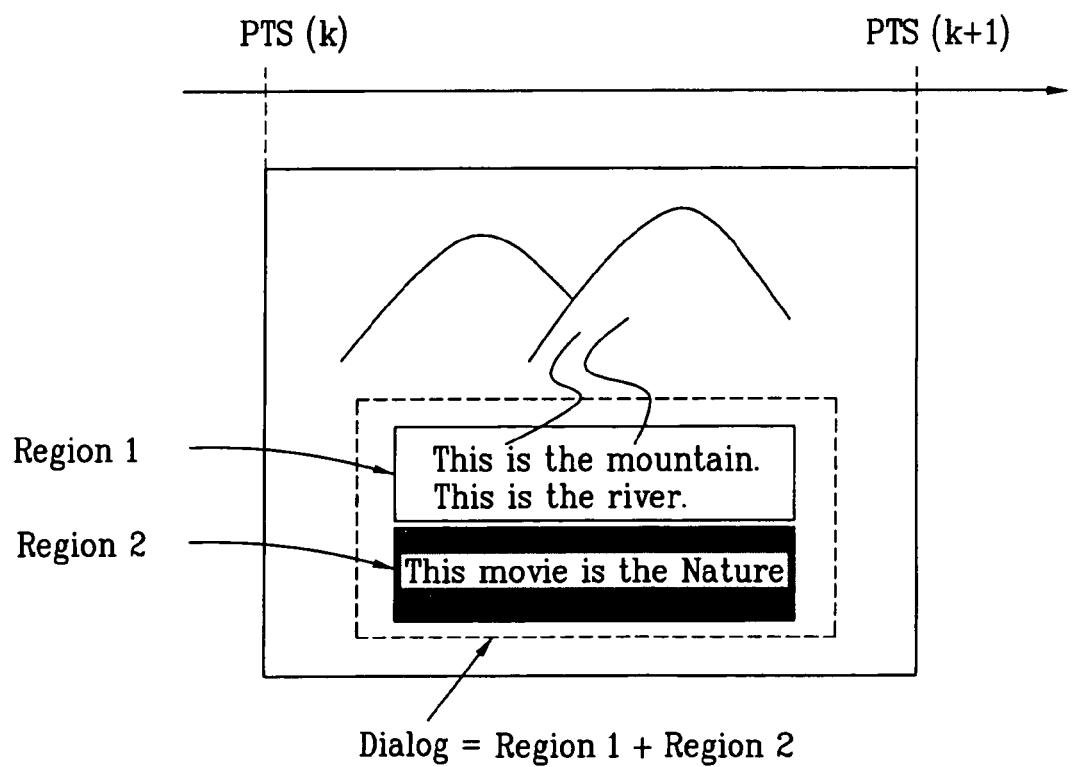
Figure 5C:
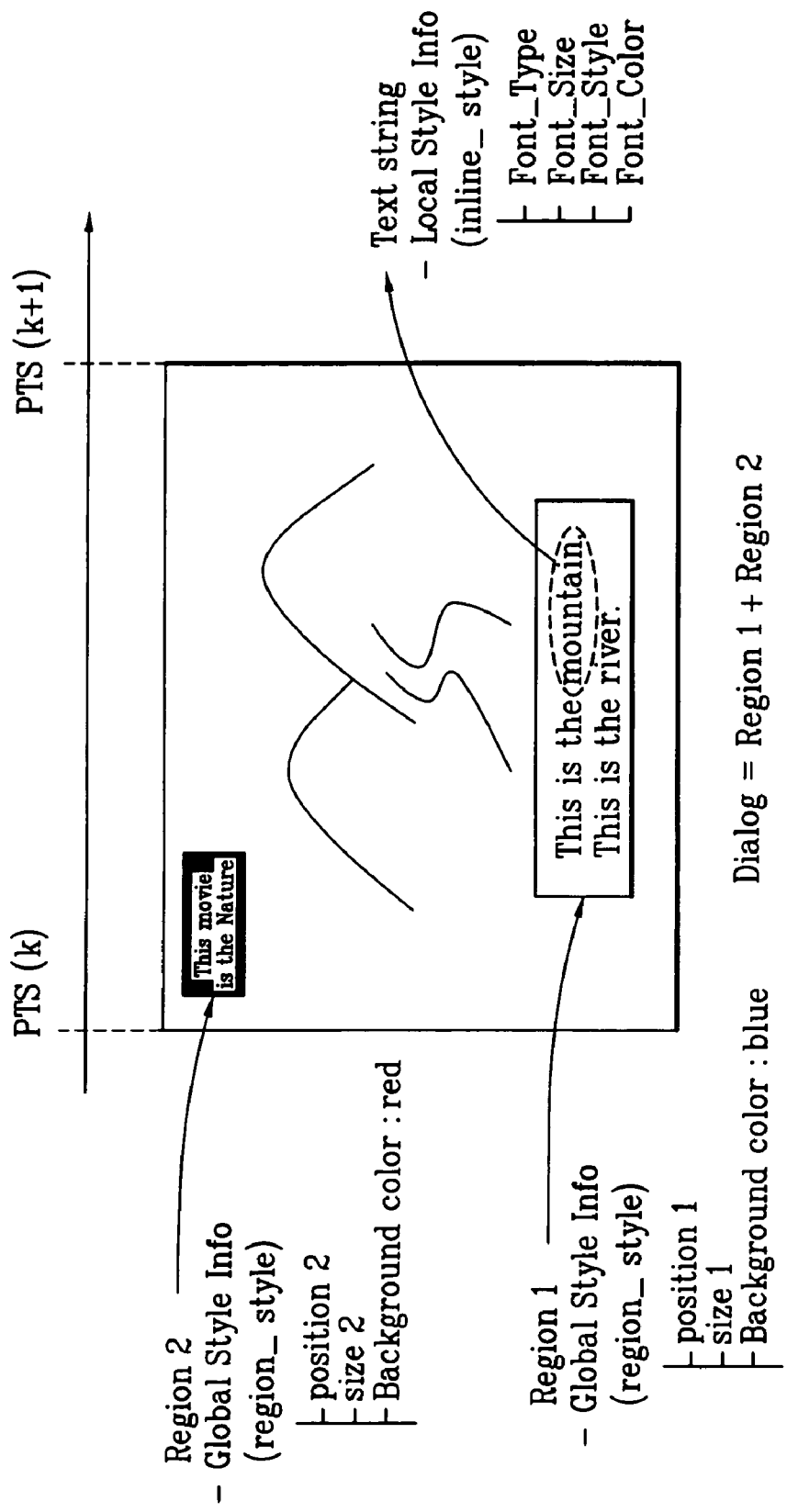

In order to display the text subtitle on the display screen, display control information (e.g., position and size information) and presentation time information, examples of which are illustrated in FIG. 5A to FIG. 5C, are required. Hereinafter, diverse information included in the text subtitle stream will be described in detail with reference to FIG. 5A to FIG. 7. And, the method of synchronizing the text subtitle stream with the main data will be described in detail with reference to FIG. 8 to FIG. 11.

FIG. 5A illustrates a dialog presented on a display screen according to the present invention. A dialog represents entire text subtitle data displayed on a display screen during a given presentation time, so as to facilitate reproduction control of the text subtitle stream. In general, presentation times of the dialog may be represented in presentation time stamps (PTS). More specifically, a PTS section for reproducing one dialog includes a "dialog_start_PTS" and a "dialog_end_PTS" for each dialog. Also, for example, presentation of the dialog shown in FIG. 5A starts at PTS (k) (i.e., dialog_start_PTS) and ends at PTS (k+1) (i.e., dialog_end_PTS). Therefore, when the dialog shown in FIG. 5A represents an entire unit of text subtitle data which are displayed on the display screen between PTS (k) and PTS (k+1), all of the text subtitle data is defined by the same dialog. Herein, a dialog includes a maximum of 100 character codes in one text subtitle.

In addition, FIG. 5B illustrates regions of a dialog according to the present invention. A region represents a divided portion of text subtitle data (dialog) displayed on a display screen during a given presentation time. In other words, a dialog includes at least one region, and each region may include at least one line of subtitle text. The entire text subtitle data representing a region may be displayed on the display screen according to a region style (global style) assigned to the region. The maximum number of regions included in a dialog should be determined based on a desired decoding rate of the subtitle data because the greater number of regions generally results in a lower decoding ratio. For example, the maximum number of regions for a dialog may be limited to two in order to achieve a reasonably high decoding rate.

FIG. 5C illustrates style information for regions of a dialog according to the present invention. Style information represents information defining properties required for displaying at least a portion of a region included in a dialog. Some of the examples of the style information are position, region size, background color, text alignment, text flow information, and many others. The style information may be classified into region style information (global style information) and inline style information (local style information).

Region style information defines a region style (global style) which is applied to an entire region of a dialog. For example, the region style information may contain at least one of a region position, region size, font color, background color, text flow, text alignment, line space, font name, font style, and font size of the region. For example, two different region styles are applied to region 1 and region 2, as shown in FIG. 5C. A region style with position 1, size 1, and blue background color is applied to Region 1, and a different region style with position 2, size 2, and red background color is applied to Region 2.

On the other hand, inline style information defines an inline style (local style) which is applied to a particular portion of text strings included in a region. For example, the inline style information may contain at least one of a font type, font size, font style, and font color. The particular portion of text strings may be an entire text line within a region or a particular portion of the text line. Referring to FIG. 5C, a particular inline style is applied to the text portion "mountain" included in Region 1. In other words, at least one of the font type, font size, font style, and font color of the particular portion of text strings is different from the remaining portion of the text strings within Region 1.

Figure 6:
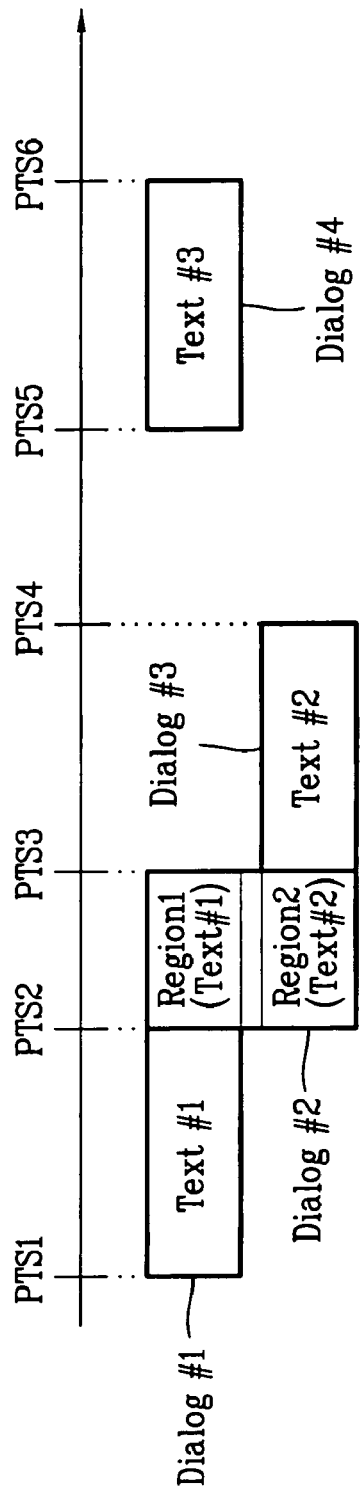
FIG. 6 illustrates a dialog, which forms a text subtitle stream according to the present invention, and its relation with a presentation time.

FIG. 6 illustrates a method of creating each dialog applied to each presentation time (PTS) section. For example, when 4 dialogs exist between PTS1 to PTS6, Dialog #1 is displayed as text data Text #1 between PTS1 and PTS2. And, Dialog #2 includes 2 regions (Region 1 and Region 2) between PTS2 and PTS3, wherein Region 1 is displayed as text data Text #1 and Region 2 is displayed as text data Text #2. Further, Dialog #3 is displayed as text data Text #2 between PTS3 and PTS4, and Dialog #4 is displayed as text data Text #3 between PTS5 and PTS6. Referring to FIG. 6, text subtitle data does not exist between PTS4 and PTS5. In the method for creating each of the above-described dialog information, each of the dialogs must include timing information (i.e., PTS set) for displaying the corresponding dialog, style information, and actual text data (hereinafter referred to as "dialog data").

Accordingly, as described above, the timing information (i.e., PTS set) being displayed is recorded as "dialog_start_PTS" and "dialog_end_NPTS". The style information is defined as the above-described Global_Style_Info and Local_Style_Info. However, in the present invention, the style information will be recorded as region_styles and inline_styles. Furthermore, text data that is displayed on the actual display screen is recorded in the dialog data. More specifically, since Dialog #2 includes 2 regions (Region 1 and Region 2), a set of style information and dialog data is recorded for each of Region 1 and Region 2.

Figure 7:
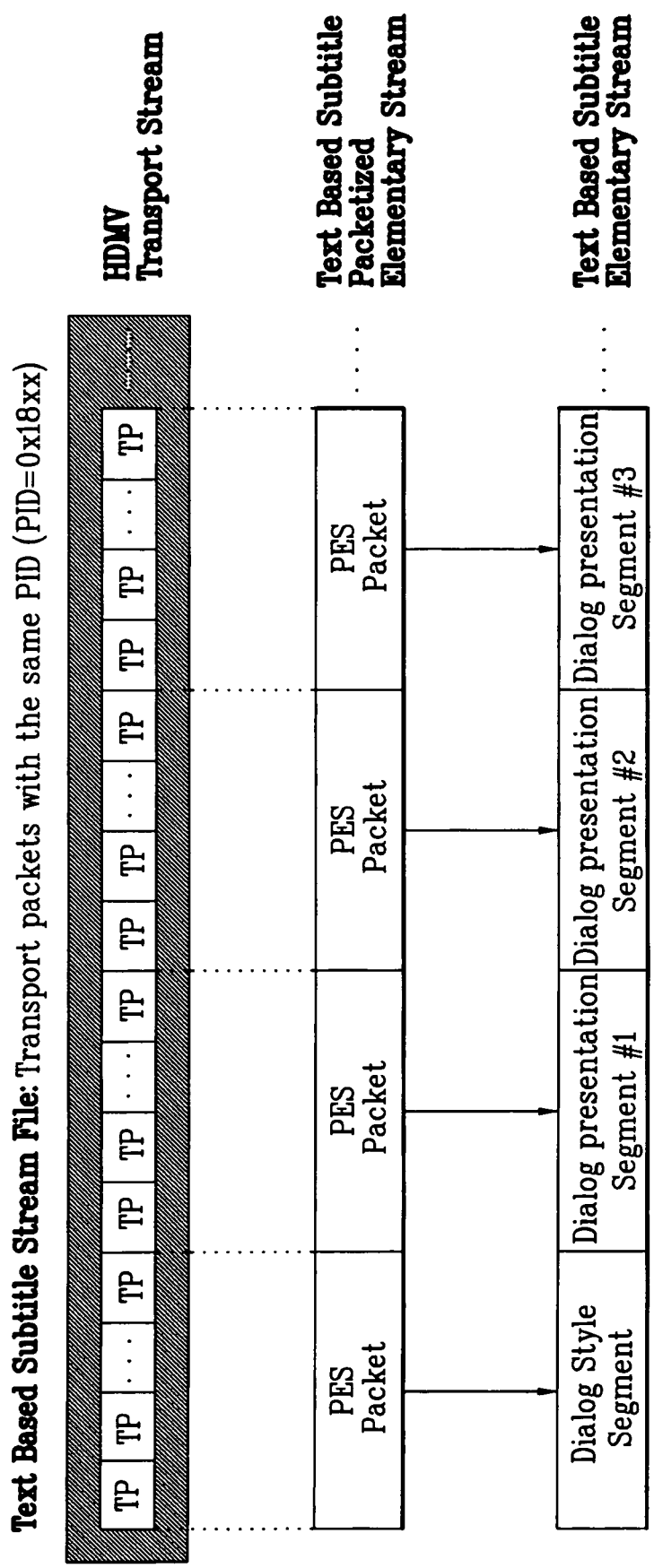
FIG. 7 illustrates a structure of the text subtitle stream according to the present invention.

FIG. 7 illustrates a text subtitle stream file (e.g., 10001.m2ts shown in FIG. 1) according to the present invention. The text subtitle stream file may be formed of an MPEG2 transport stream including a plurality of transport packets (TP), all of which have a same packet identifier (e.g., PID=0x18xx). When a disc player receives many input streams including a particular text subtitle stream, it finds all the transport packets that belong to the text subtitle stream using their PIDs. Referring to FIG. 7, each sub-set of transport packets form a packet elementary stream (PES) packet. One of the PES packets shown in FIG. 7 corresponds to a dialog style segment (DSS) defining a group of region styles. All the remaining PES packets after the second PES packet correspond to dialog presentation segments (DPSs).

In the above-described text subtitle stream structure of FIG. 7, each of the dialog information shown in FIGS. 5A to 5C and FIG. 6 represent a dialog presentation segment (DPS). And, the style information included in the dialog information represents a set of information that links any one of the plurality of region style sets defined in the dialog style segment (DSS), which can also be referred to as "region_style_id", and inline styles. A standardized limited number of region style sets is recorded in the dialog style segment (DSS). For example, a maximum of 60 sets of specific style information is recorded, each of which is described by a region_style_id.

FIG. 8 illustrates a syntax structure of a sub path and a SubPlayItem according to the present invention. Herein, the sub path and the SubPlayItem are not used to control reproduction of the text subtitle stream only. Rather, an object of the sub path and the SubPlayItem is to define and reproduce diverse supplementary data including the text subtitle stream, depending upon the sub path type, which will be described in a later process. Therefore, a specific field within the syntax structure of the sub path and the SubPlayItem will be defined to have a specific value, when the specific field is irrelevant to the text subtitle stream or when the specific field is used in the text subtitle stream.

More specifically, referring to FIG. 8, a SubPath( ) syntax designates a path of the supplementary data that is associated with the main data included in a single PlayList. The SubPath( ) syntax includes a SubPath type field, an is_repeat_SubPath field, a number_of_SubPlayItems field, and a SubPlayItem(i) field. Herein, the SubPath_type field designates the type of a sub path. SubPath_type=2 represents a supplementary audio browsable slideshow, SubPath_type=3 represents an interactive graphic presentation menu, and SubPath_type=4 represents a text subtitle presentation. Therefore, the optical recording and reproducing apparatus according to the present invention can determined which type of clip is being controlled by each corresponding sub path through the SubPath_type field. Also, the number_of_SubPlayItems field represents the number of SubPlayItems included within the sub path. Herein, the optical recording and reproducing apparatus can verify the number of SubPlayItems that are being controlled in the specific sub path through the number_of_SubPlayItems field. The is_repeat_SubPath field represents a set of 1-byte flag information for verifying whether the corresponding SubPath is to be used repeatedly. More specifically, when is_repeat_SubPath=0b the SubPath is not used repeatedly, and when is_repeat_SubPath=1b the SubPath is used repeatedly.

Accordingly, when controlling reproduction of the text subtitle stream by using the SubPath, SubPath_type=4, number_of_SubPlayItems=1, and is_repeat_SubPath=0b. In other words, in the SubPath controlling the text subtitle stream, a single SubPlayItem controls reproduction of a plurality of text subtitle streams (e.g., as shown in FIG. 4), and the SubPath is not used repeatedly. Therefore, when reproducing the supplementary audio browsable_slideshow as SubPath_type=2, and when producing the interactive graphic presentation menu stream as SubPath_type=3, the number_of_SubPlayItems field and the is_repeat_SubPath field may be defined differently and used.

In addition, a detailed syntax of the SubPlayItem(i) field will now be described. A Clip_Information_file_name field is used as information designating a file name of a stream that is controlled by the corresponding SubPlayItem, and a Clip_codec_identifier field represents a coding format of the designated clip. As described above, since the text subtitle information according to the present invention is encoded in an MPEG-2 format, the Clip_codec_identifier field is defined as Clip_codec_identifier=M2TS. Also, a SubPlayItem_IN_time field and a SubPlayItem_OUT_time field are used as information for designating the reproduction begin time and reproduction end time within the designated clip. Accordingly, as described in FIG. 1, the SubPlayItem_IN_time and the SubPlayItem_OUT_time are changed to a set of address information (also referred to as a source packet number (SPN)) within the designated ClipInfo file (*.clpi), so as to decide the reproduction section within the actual clip. Further, a ref_to_STC_id field represents information deciding a position of a seamless reproduction unit, which is applied to the reproduction section, within the designated clip, a detailed description of which will be described in detail with reference to FIG. 10.

An is_multi_clip_entries field is a set of 1-byte flag information representing a number of clip entries being controlledby the corresponding SubPlayItem. For example, referring to FIG. 4, since a plurality of clips exists when 2 text subtitle clips are controlled by a single SubPlayItem, is_multi_clip_entries=1b. Therefore, when is_multi_clip_entries=1b, at least 2 clip entries exist, and in this case, a subclip_entry_id is assigned to each clip entry, and a specific Clip_Information_file_name field, Clip_codec_identifier field and a ref_to_STC_id field for each subclip_entry_id are defined.

Finally, a set of information for a synchronization with the main data is included within the SubPlayItem syntax, wherein the information includes a sync_PlayItem_id field and a sync_ start_PTS_of_PlayItem field. More specifically, the sync_PlayItem_id field and the sync_start_PTS_of_PlayItem field are used only when reproduction control of the text subtitle stream is performed by using the SubPlayItem. Therefore, when reproducing the supplementary audio browsable slideshow as SubPath_type=2, and when reproducing the interactive graphic presentation menu stream as SubPath_type=3, the sync_PlayItem_id field and the sync_start_PTS_of_PlayItem field become unnecessary information, and in this case, the corresponding field is set as '00h'.

Figure 9:
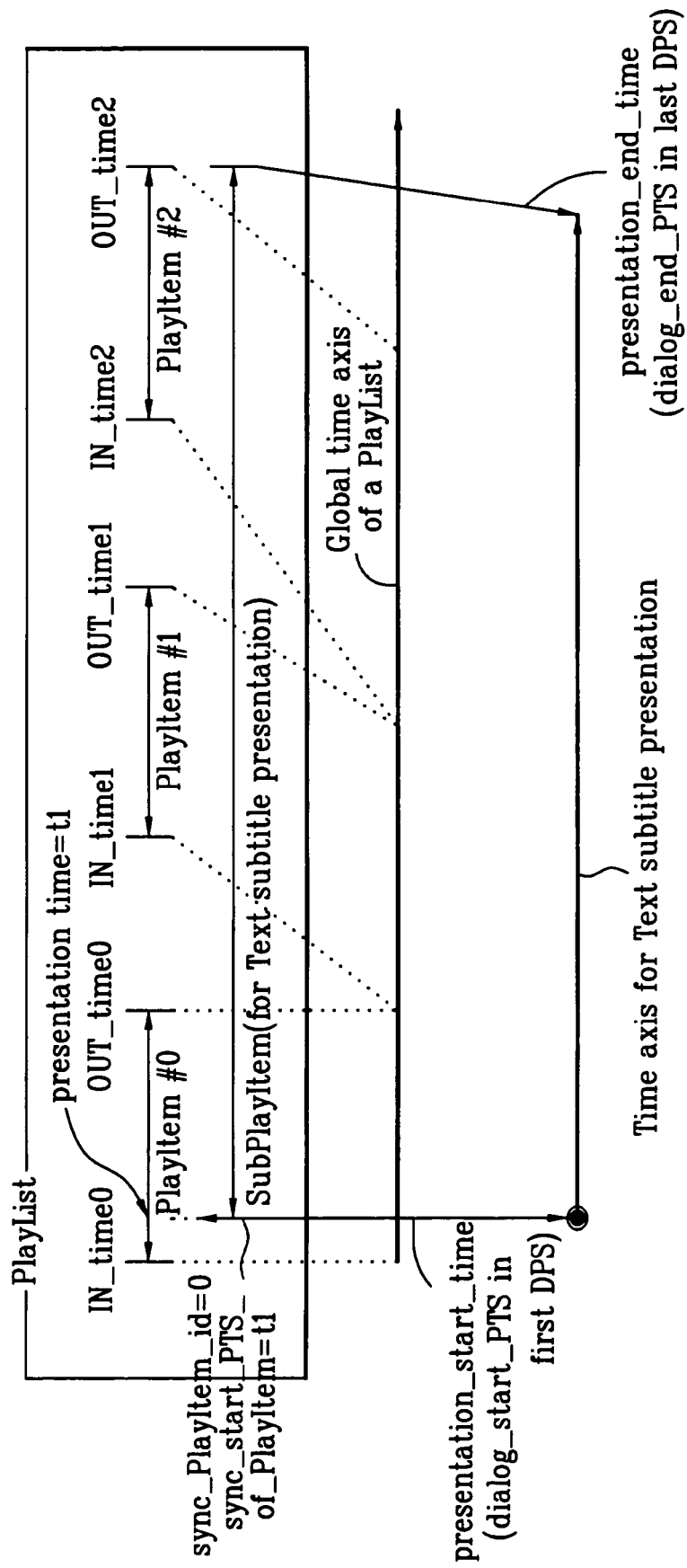
FIG. 9 illustrates a method of synchronizing the text subtitle stream and a main AV stream according to the present invention.

In describing the sync_PlayItem_id field and the sync_start_PTS_of_PlayItem field, the sync information for reproducing the text subtitle stream according to the present invention will now be described with reference to FIG. 9. First of all, the text subtitle stream is synchronized with the main data, and the reproduction begin time of the text subtitle stream being synchronized with the main data is decided by the sync_PlayItem_id field and the sync_start_PTS_of_PlayItem field. More specifically, the sync_PlayItem_id field is a set of information designating a specific PlayItem among at least one PlayItems within the PlayList file. And, the sync_start_PTS_of_PlayItem field is a set of information indicating the reproduction begin time of the text subtitle stream as a PlayItem PTS, within the designated specific PlayItem. For example, referring to FIG. 9, in the SubPlayItem for reproducing the text subtitle stream, as information for deciding the reproduction begin time of the text subtitle stream being synchronized with the main data, the sync_PlayItem_id field and the sync_start_PTS_of_PlayItem field may be defined as sync_PlayItem_id=0 and sync_start_PTS_of_PlayItem=t1. More specifically, reproduction of the text subtitle stream using the SubPlayItem begins at a specific point of "t1(PTS)" within PlayItem 1 (PlayItem_id=0).

Secondly, the text subtitle stream uses a counter of 90 kilohertz (khz) as a system time clock. And, an initial value of the counter is the dialog_start_PTS within the first dialog presentation segment (DPS #1), shown in FIG. 7. More specifically, unlike other streams, the text subtitle stream does not have a program clock reference (PCR) as the initial value. Accordingly, all PTS (dialog_start_PTS and dialog_end_PTS) values within subsequent dialog presentation segments (DPS) are decided by counting from the dialog_start_PTS within the first dialog presentation segment (DPS #1).

Therefore, reproduction of the text subtitle begins starting from the time decided by the sync_PlayItem_id field and the sync_start_PTS of_PlayItem field. Afterwards, a system time clock counter of 90 kilohertz (khz), having an initial value identical to that of the dialog_start_PTS within the first dialog presentation segment (DPS #1), is used so as to reproduce each dialog in accordance with the PTS (dialog_start_PTS and dialog_end_PTS) value for each dialog defined within the dialog presentation segment (DPS) included in the text subtitle stream. Thereafter, reproduction ends at dialog_end_PTS within the last dialog presentation segment (last DPS) included in the text subtitle stream.

Figure 10:
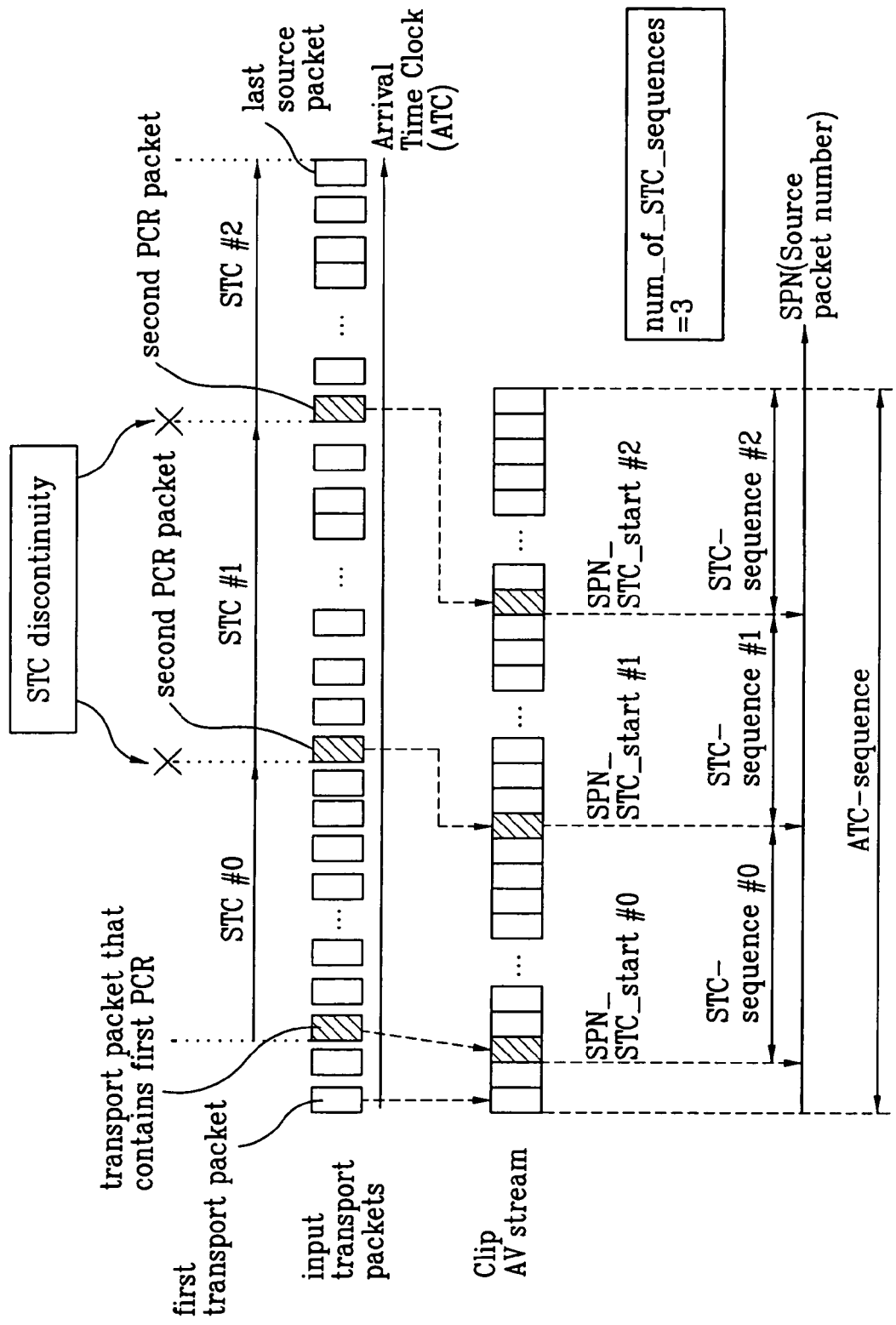
FIG. 10 illustrates a set of type information included in a general AV stream.

FIG. 10 illustrates a system time clock sequence (STC_sequence) and an arrival time clock sequence (ATC_sequence) within the clip according to the present invention. Accordingly, the STC_sequence refers to a continuous clip that is decided by a time reference. More specifically, a new STC sequence is created starting from a packet, which includes a program clock reference (PCR) as the time reference, among the transport packets being inputted. In the example shown in FIG. 10, a total of 3 STC_sequences (i.e., STC #0, STC #1, and STC #2) exists. Therefore, a STC_discontinuity may occur between each STC_sequence. Also, at least one STC_sequence (e.g., STC #0, STC #1, and STC #2) configures a single ATC_sequence. More specifically, each of the clips within -the optical disc is formed of an ATC_sequence including at least one STC_sequence.

However, the number of ATC_sequence is not limited to only one ATC_sequence, as described in the example shown in FIG. 10. In other words, the clip may include a plurality of ATC_sequences. Accordingly, in case of the text subtitle stream, the system time clock is decided by using the dialog_start_PTS within the first dialog presentation segment (DPS #1) as an initial value. Thus, the text subtitle stream is formed of an ATC_sequence including a STC_sequence.

FIG. 11 illustrates a set of information recorded within a ClipInfo file (*.clpi) according to the present invention and, more specifically, illustrates information included in a SequenceInfo( ) area. Referring to FIG. 11, a field for recording STC_sequence and ATC_sequence information of each corresponding clip is included in the SequenceInfo( ) area within the ClipInfo file (*.clpi). More specifically, information on the number of ATC_sequences is recorded in a number_of_ATC_sequences field. And, in the present invention, one ATC_sequence is included in the text subtitle clip. Therefore, since only one ATC_sequence is included in the text subtitle clip, only an ATC ID exists as atc_id=0. Additionally, a number_of_STC_sequences(atc_id) field includes information on the number of STC_sequences within the ATC_sequence (e.g., atc_id=0). And, as described above, only one STC_sequence is included in the text subtitle clip according to the present invention. Further, a stc_id is assigned to each STC_sequence, and each stc_id includes a PCR_PIC field, a SPN_STC_start field, a presentation_start_time field, and a presentation_end_time field.

Herein, a set of information designating packet identification (PID) including a program clock reference (PCR), which is a time reference of the STC_sequence, is recorded in the PCR_PID field. And, a set of information designating a start source packet number (SPN) of the STC_sequence is recorded in the SPN_STC_start field. Accordingly, since a PCR does not exist in the text subtitle clip according to the present invention, either a dummy data having no meaning is recorded in the PCR_PID field, or the PCR_PID field is set as '00h'. Finally, a set of information designating the starting time and the ending time of each corresponding clip is respectively recorded in the presentation_start_time field and the presentation_end_time field. Accordingly, as described above, the presentation_start_time of the clip becomes the dialog_start_PTS within the first dialog presentation segment (DPS #1), and the presentation_end_time becomes the dialog_end_PTS within the last dialog presentation segment (last DPS).

Figure 12:
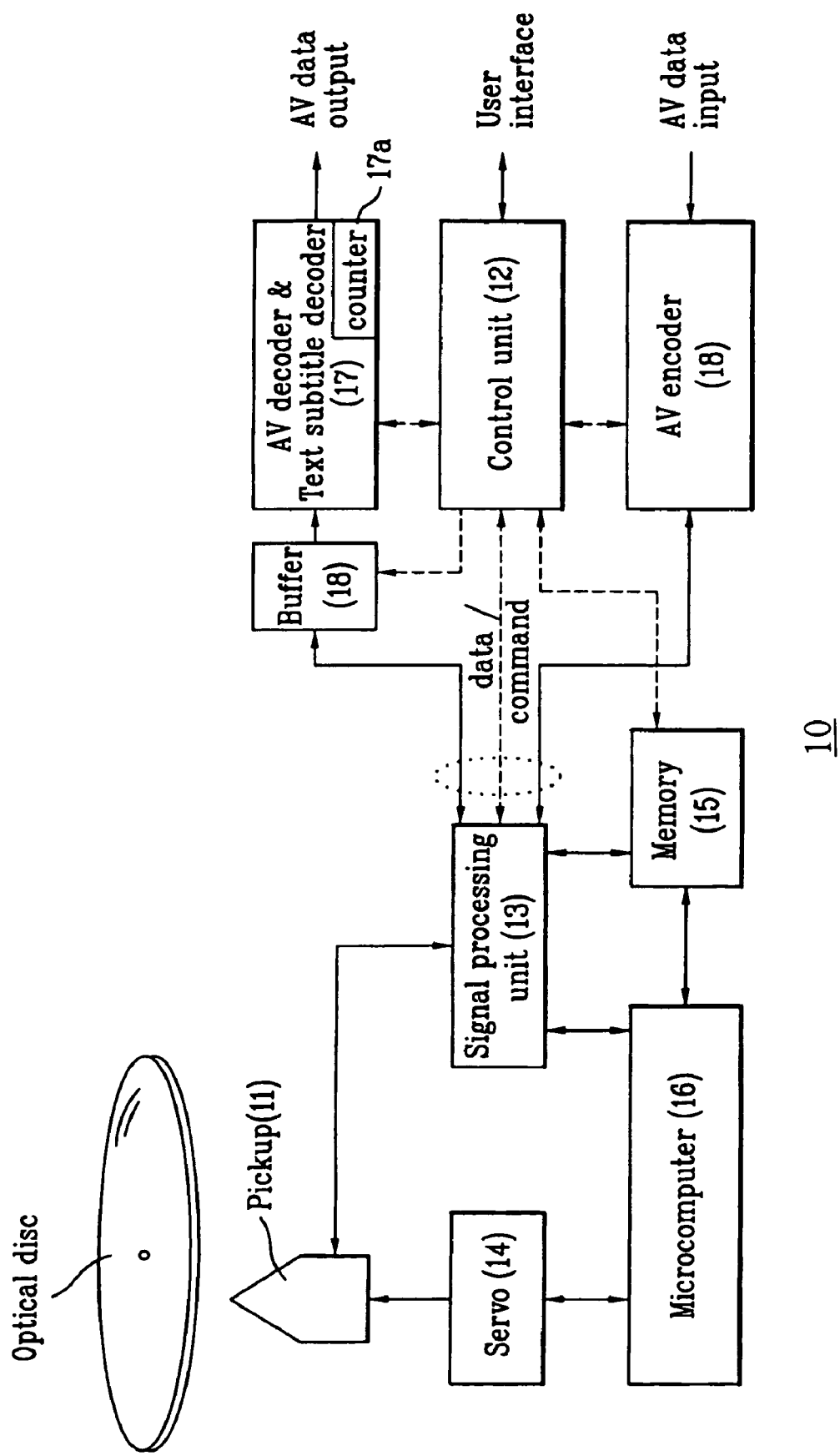
FIG. 12 illustrates an optical recording and/or reproducing apparatus including a reproduction of the text subtitle stream file according to the present invention.

FIG. 12 illustrates a detailed view of an optical recording and/or reproducing apparatus 10 according to the present invention, including the reproduction of the text subtitle data. The optical recording and/or reproducing apparatus 10 basically includes a pick-up unit 11 for reproducing main data, text subtitle stream and corresponding reproduction control information recorded on the optical disc, a servo 14 controlling the operations of the pick-up unit 11, a signal processor 13 either recovering the reproduction signal received from the pick-up unit 11 to a desired signal value, or modulating a signal to be recorded to an optical disc recordable signal and transmitting the modulated signal, and a microcomputer 16 controlling the above operations.

In addition, an AV decoder and text subtitle (Text ST) decoder 17 performs final decaying of output data depending upon the controls of the controller 12. And, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13. Accordingly, the AV decoder and text subtitle (Text ST) decoder 17 is included in the present invention as a single decoder, for simplicity of the description. However, it is apparent that only the text subtitle (Text ST) decoder can be independently included as an element of the present invention.

A buffer 18 is used for preloading and storing the text subtitle stream in advance, in order to decode the text subtitle stream according to the present invention. The controller 12 controls the operations of the optical recording and/or reproducing apparatus. And, when the user inputs command requesting a text subtitle of a specific language to be displayed. Then, the corresponding text subtitle stream is preloaded and stored in the buffer 18. Subsequently, among the text subtitle stream data that is preloaded and stored in the buffer 18, the controller 12 refers to the above-described dialog information, region information, style information, and so on, and controls the text subtitle decoder 17 so that the actual text data are displayed with a specific size and at a specific position on the screen.

More specifically, the text subtitle decoder 17 reproduces the text subtitle stream preloaded in the buffer 18. However, the text subtitle decoder 17 includes a counter 17a, so as to set the dialog_start_PTS within the first dialog presentation segment (DPS #1) as an initial value, so as to create the system time clock (e.g., by using a frequency of 90 khz). Furthermore, the text subtitle decoder 17 verifies a synchronization point of the text subtitle stream with the main data from the SubPlayItem within the PlayList file associated with the reproduction of the text subtitle clip. For example, information included in the sync_PlayItem_id_field and the sync_start_PTS_of_PlayItem field within the above-described SubPlayItem is read, and based upon the read information, the text subtitle stream is reproduced starting from a specific time within a specific PlayItem.

As described above, the recording medium and method and apparatus for reproducing and recording text subtitle streams have the following advantages. The text subtitle stream is synchronized with the main data, and therefore, the text subtitle stream and the main data are reproduced simultaneously.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A computer readable medium storing a data structure for reproducing text subtitle streams, the computer readable medium comprising:

a first data area storing at least one PlayList file, each PlayList file containing a set of PlayItems and at least one SubPlayItem, each PlayItem being configured to reproduce at least one main AV stream, each SubPlayItem including a multi-clip-entries field indicating whether a multi-clip-entries structure is present or not present, the SubPlayItem being configured to reproduce at least one text subtitle stream, each PlayList file further containing synchronization information which includes a field indicating a presentation start time of the SubPlayItem within a playing time interval of one of the set of PlayItems; and a second data area storing the at least one main AV stream and the at least one text subtitle stream.

2. The computer readable medium of claim 1, wherein each text subtitle stream includes a plurality of dialog presentation segments, each dialog presentation segment including at least one region of dialog text.

3. The computer readable medium of claim 2, wherein each dialog presentation segment specifies presentation start and end times of the at least one region of dialog text.

4. The computer readable medium of claim 1, wherein the synchronization information is contained in the SubPlayItem.

5. The computer readable medium of claim 1, wherein the synchronization information further includes a field indicating a PlayItem identification value of the one of the set of PlayItems.

6. The computer readable medium of claim 1, wherein the SubPlayItem starts its presentation when presentation of the PlayItem has reached to the presentation start time of the SubPlayItem.

7. The computer readable medium of claim 1, wherein the SubPlayItem includes a data field specifying a name of a Clip information file which corresponds to each text subtitle stream.

8. A method of reproducing text subtitle streams, the method comprising:

reading a PlayList file recorded on a computer readable medium;

reading a set of PlayItems and at least one SubPlayItem included in the PlayList file, each PlayItem being configured to reproduce at least one main AV stream recorded on the computer readable medium, each SubPlayItem being configured to reproduce at least one text subtitle stream recorded on the computer readable medium, each SubPlayItem including a multi-clip-entries field indicating whether a multi-clip-entries structure is present or not present;

reading synchronization information included in the SubPlayItem, the synchronization information indicating a presentation start time of the SubPlayItem within a playing time interval of one of the set of PlayItems; and synchronizing presentation of the SubPlayItem with presentation of the one of the set of PlayItems.

9. The method of claim 8, wherein each text subtitle stream includes a plurality of dialog presentation segments, each dialog presentation segment including at least one region of dialog text.

10. The method of claim 9, wherein the each dialog presentation segment specifies a presentation start time and a presentation end time of the at least one region of dialog text.

11. The method of claim 8, wherein the SubPlayItem is presented when a presentation of the PlayItem has reached to a presentation start time of the SubPlayItem.

12. The method of claim 8, wherein the SubPlayItem includes a data field specifying a name of a Clip information file corresponding to a text subtitle stream.

13. The method of claim 8, wherein the synchronization information further indicates a PlayItem identification value of one of the set of PlayItems.

14. An apparatus for reproducing text subtitle streams, the apparatus comprising:

a pickup configured to reproduce data recorded on a computer readable medium; and a controller configured to control the pickup to reproduce at least one PlayList file recorded on the computer readable medium, each PlayList file containing a set of PlayItems and at least one SubPlayItem, each PlayItem being configured to reproduce at least one main AV stream, each SubPlayItem including a multi-clip-entries field indicating whether a multi-clip-entries structure is present or not present, the SubPlayItem being configured to reproduce at least one text subtitle stream, the SubPlayItem including synchronization information which indicates a presentation start time of the SubPlayItem within a playing time interval of one of the set of PlayItems.

15. The apparatus of claim 14, wherein the controller is configured to control the pickup to reproduce each text subtitle stream including a plurality of dialog presentation segments, each dialog presentation segment including at least one region of dialog text.

16. The apparatus of claim 15, wherein the controller is configured to control the pickup to reproduce each dialog presentation segment specifying the presentation start and a presentation end time of the at least one region of dialog text.

17. The apparatus of claim 14, wherein the controller is configured to control the pickup to reproduce the synchronization information being contained in the SubPlayItem.

18. The apparatus of claim 14, wherein the controller is configured to control the pickup to reproduce the synchronization information indicating a PlayItem identification value of the one of the set of PlayItems.

19. The apparatus of claim 14, wherein the controller is configured to control the pickup to reproduce the SubPlayItem when a presentation of the PlayItem has reached a presentation start time of the SubPlayItem.

20. The apparatus of claim 14, wherein the controller is configured to control the pickup to reproduce the SubPlayItem including a data field specifying a name of a Clip information file corresponding to a text subtitle stream.

21. A method of recording text subtitle streams, the method comprising:

recording at least one PlayList file, each PlayList file containing a set of PlayItems and at least one SubPlayItem, each PlayItem being configured to indicate at least one main AV stream, each SubPlayItem being configured to indicate at least one text subtitle stream, each SubPlayItem including a multi-clip-entries field indicating whether a multi-clip-entries structure is present or not present, the PlayList file further containing synchronization information which indicates a presentation start time of the SubPlayItem within a playing time interval of one of the set of PlayItems; and recording the at least one main AV stream and the at least one text subtitle stream.

22. The method of claim 21, wherein each text subtitle stream includes a plurality of dialog presentation segments, each dialog presentation segment including at least one region of dialog text.

23. The method of claim 22, wherein the each dialog presentation segment specifies a presentation start and end time of the at least one region of dialog text.

24. The method of claim 21, wherein the SubPlayItem is presented when the PlayItem has reached the presentation start time of the SubPlayItem.

25. The method of claim 21, wherein the SubPlayItem includes a data field specifying a name of a Clip information file corresponding to the a subtitle stream.

26. The method of claim 21, wherein the synchronization information is contained in the SubPlayItem.

27. The method of claim 21, wherein the synchronization information indicates a PlayItem identification value of the one of the set of PlayItems.

28. An apparatus for recording text subtitle streams, the apparatus comprising:

a pickup configured to record data on a computer readable medium; and a controller configured to control the pickup to record at least one PlayList file, each PlayList file containing a set of PlayItems and at least one SubPlayItem, each PlayItem being configured to indicate at least one main AV stream, each SubPlayItem including a multi-clip-entries field indicating whether of multi-clip entries structure is present or not present, the SubPlayItem being configured to indicate at least one text subtitle stream, the PlayList file further containing synchronization information which indicates a presentation start time of the SubPlayItem within a playing time interval of one of the set of PlayItems.

29. The apparatus of claim 28, wherein the controller is configured to control the pickup to reproduce each text subtitle stream including a plurality of dialog presentation segments, each dialog presentation segment including at least one region of dialog text.

30. The apparatus of claim 29, wherein the controller is configured to control the pickup to reproduce the each dialog presentation segment specifying presentation start and end times of the at least one region of dialog text.

31. The apparatus of claim 28, wherein the controller is configured to control the pickup to reproduce the synchronization information being contained in the SubPlayItem.

32. The apparatus of claim 28, wherein the controller is configured to control the pickup to reproduce the synchronization information indicating a PlayItem identification value of the one of the set of PlayItems.

33. The apparatus of claim 28, wherein the controller is configured to control the pickup to reproduce the SubPlayItem when a presentation of the PlayItem has reached a presentation start time of the SubPlayItem.

34. The apparatus of claim 28, wherein the controller is configured to control the pickup to reproduce the SubPlayItem including a data field specifying a name of a Clip information file corresponding to a subtitle stream.

* * * * *